United States Patent [19]

Tanaka et al.

[11] Patent Number: 4,635,598
[45] Date of Patent: Jan. 13, 1987

[54] SWIRL CHAMBER ARRANGEMENT FOR DIESEL ENGINE OR THE LIKE

[75] Inventors: Toshiaki Tanaka, Fujisawa; Kunihiko Sugihara, Tokyo, both of Japan

[73] Assignee: Nissan Motor Co., Ltd., Yokohama, Japan

[21] Appl. No.: 817,287

[22] Filed: Jan. 9, 1986

[30] Foreign Application Priority Data

Jan. 25, 1986 [JP] Japan .................................. 60-11025

[51] Int. Cl.$^4$ .................. F02B 19/18; F02B 19/10; F02B 19/00; F02B 19/16
[52] U.S. Cl. ...................... 123/293; 123/261; 123/262; 123/285; 123/286
[58] Field of Search ............... 123/293, 285, 286, 289, 123/291, 290, 261, 262, 263, 253, 255, 268, 269, 275, 281

[56] References Cited

U.S. PATENT DOCUMENTS

| | | | |
|---|---|---|---|
| 3,965,872 | 6/1976 | Taira et al. | 123/262 |
| 4,006,720 | 2/1977 | Sato et al. | 123/285 |
| 4,116,191 | 9/1978 | Yanugihara et al. | 123/262 |
| 4,204,484 | 5/1980 | Miura | 123/293 |
| 4,395,983 | 8/1983 | Hamai et al. | 123/262 |
| 4,406,260 | 9/1983 | Burley | 123/262 |
| 4,541,375 | 9/1985 | Tanaka | 123/261 |

Primary Examiner—Raymond A. Nelli
Attorney, Agent, or Firm—Leydig, Voit & Mayer

[57] ABSTRACT

In a pre-chamber type diesel engine, in order to prevent droplets of liquid fuel finding their way into zones of the main combustion chamber wherein they undergo slow combustion and thus tend to form smoke, a recess is formed at the main combustion chamber end of an auxiliary transfer passage in a manner to provide a wall section which deflects droplets of fuel, which have passed through the auxiliary passage during the induction phase and/or initial stage of the compression phase, in a manner that they do not escape toward the perimeter of the piston crown and remain in a zone through which the flame produced by spontaneous combustion of the highly compressed air-fuel mixture in the pre-chamber passes thus ensuring rapid vaporization and subsequent oxidation.

4 Claims, 9 Drawing Figures

SWIRL CHAMBER ARRANGEMENT FOR DIESEL ENGINE OR THE LIKE

BACKGROUND OF THE INVENTION

1. Field of the Invention

The present invention relates generally to a pre-chamber type diesel engines and more specifically to a transfer passage arrangement for such a diesel engine which obviates smoke formation due to combustion of fuel droplets in the main combustion chamber associated therewith.

2. Description of the Prior Art

FIG. 1 of the drawings shows a previously proposed combustion chamber arrangement 1 which includes a cavity 2 formed in the cylinder head 3 and a plug member 4 which closes the cavity to define a pre-chamber 5 into which fuel is injected by a fuel injector 6. The plug 4 is formed with a main transfer passage 7 which leads from the main combustion chamber 8 to the pre-chamber 5 so as to introduce the charge compessed in the main combustion chamber 8 into the pre-chamber in manner which causes it to assume a cyclonic swirling pattern therein.

In order to permit a fraction of the injected liquid fuel to pass from the pre-chamber 5 to the main combustion chamber 8 an auxiliary passage 9 is provided. This passage 9 permits an amount of relatively well atomized fuel escape from the pre-chamber 5 during the compression phase and thus reduce the amount of fuel involved in the initial spontaneous combustion which occurs therein upon the temperature and pressure of the charge reaching a sufficiently high level. This reduces the peak combustion temperature and the amount of NOx which tends to be formed.

To assist in the dispersion of the flame which is torched into the main combustion chamber 8 following the above mentioned spontaneous ignition of the rich charge in pre-chamber 5, and thus promote the combustion of the lean mixture present in the main combustion chamber, the crown of the piston 10 is provided with a so called "clover leaf" dispersion recess arrangement comprised of a elongate trench 11 and circular shallow dispersion sections 12 on either side thereof.

However, this arrangement has encountered the drawback that, in order to promote the desired amount of swirl in the pre-chamber 5, the main transfer passage 7 must be angled with respect to the pre-chamber so that the incomming charge enters the same essentially tangentially with respect the walls thereof, while in order to control the amount of liquid fuel which enters the main combustion chamber 8 the auxiliary transfer passage 9 is generally required to be angled with respect to the main one in manner which approaches 90 degrees. This disposition brings about the situation wherein the fuel droplets which pass through the auxiliary transfer passage 9 tend to impinge on the bottom of the trench 11 in a manner which induces the same to splash back up toward the cylinder head 3 and induces the situation wherein a faction of the same tends to escape beyond the bounds of the clover leaf recess and find its way into clearance H.

Under these circumstances, due to the relatively low exposure to the flame which is ejected from the pre-chamber and which is dispersed in the shaped recess in the piston crown, combustion of these fugitive droplets is slow promoting the formation of smoke.

SUMMARY OF THE PRESENT INVENTION

It is an object of the present invention to provided a simple swirl or pre-chamber arrangement which obviates the tendancy for fuel droplets to travel to locations in the combustion chamber where they tend to combustion slowly and form smoke.

In brief, the above object is achieved in a pre-chamber type diesel engine wherein, a recess is formed at the main combustion chamber end of an auxiliary transfer passage in a manner to provide a wall section which deflects droplets of fuel, which have passed through the auxiliary passage during the induction phase and/or initial stage of the compression phase and have splashed up out of a trench formed in the crown of the piston, in a manner that they do not escape toward the perimeter of the piston crown and remain in a zone through which the flame produced by spontaneous combustion of the highly compressed air-fuel mixture in the pre-chamber passes thus ensuring rapid vaporization and subsequent oxidation.

More specifically, the present invention comes in the form of an internal combustion engine which includes a blind bore; a piston reciprocatively disposed in the bore in manner to defined a variable volume main combustion chamber, the piston having a crown; a shaped recess in the crown of the piston; a fixed volume pre-chamber adjacent the blind end of the bore; a main transfer passage, the main transfer passage having a first end which communicates with the pre-chamber and a second end which communicates with the main combustion chamber, the main transfer passage and the pre-chamber being arranged so that the main transfer passage introduces an air containing charge compressed in the main combustion chamber during a compression phase of the engine into the pre-chamber in a manner that the charge introduced into the pre-chamber tends to swirl in a predetermined direction therein; a fuel injector for injecting fuel into the pre-chamber; an auxiliary transfer passage having a first end which communicates with the pre-chamber and a second end which communicates with the main combustion chamber, the auxiliary transfer passage being oriented with respect to the fuel injector and the direction in which the charge in the pre-chamber swirls so as to permit a fraction of the injected fuel to pass therethrough and enter the main combustion chamber prior combustion of the air-fuel mixture in the pre-chamber, the auxiliary transfer passage being arranged to direct the fuel introduced into the main combustion chamber into the shaped recess formed in the crown of the piston; and a recess which merges with the second end of the auxiliary transfer, the recess having a wall which is inclined toward the first end of the main transfer passage, the wall deflecting fuel which splashes up out of the shaped recess into the recess and into a zone through which the flame from the swirl chamber passes during the expansion phase of the engine.

BRIEF DESCRIPTION OF THE DRAWINGS

The features and advantages of the arrangement present invention will become more clearly appreciated from the following description taken in conjunction with the accompanying drawings in which.

DETAILED DESCRIPTION OF THE PREFERRED EMBODIMENTS

Figure 3:
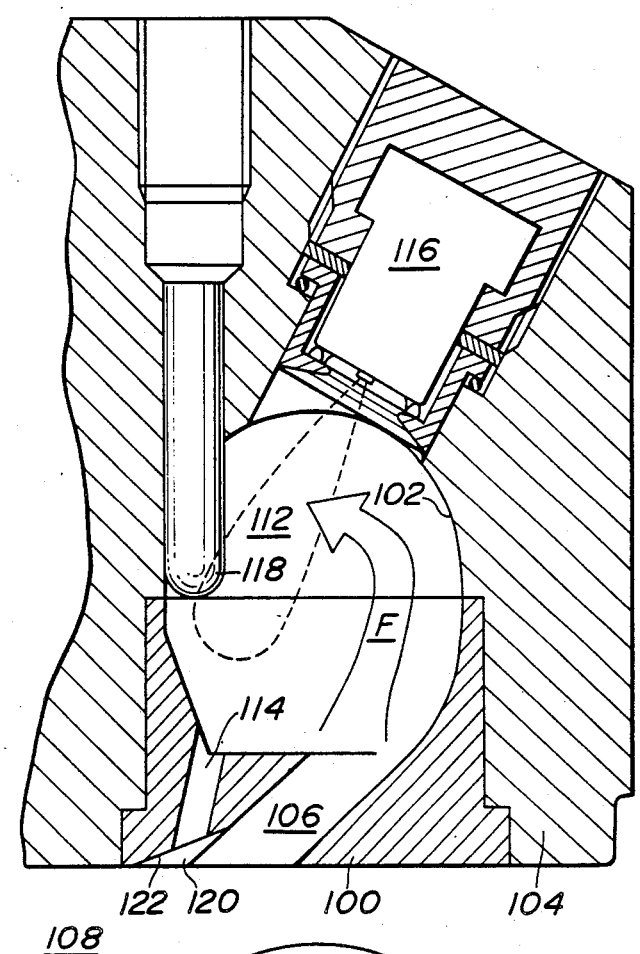
FIG. 3 is a sectional elevation of a first embodiment of the present invention.
Figure 4:
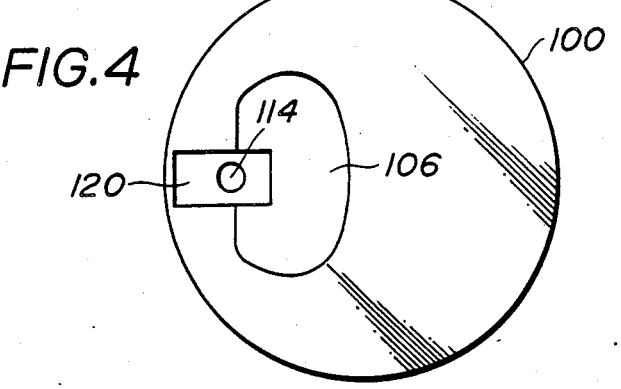
FIG. 4 is a plan view showing the lower surface of the plug member shown in FIG. 3.

FIGS. 3 and 4 show a first embodiment of the present invention. In this arrangement, the plug member 100 which is disposed in the mouth of the cavity 102 formed in the lower face of the cylinder head 104, includes a main transfer passage 106 which, as shown, is angled so that the charge which is compressed in the main combustion chamber 108 during the compression stroke of piston 10 is introduced into the swirl chamber 112 defined in the cavity 102 by the plug 100 so that it swirls essentially in the direction shown by arrow F. The plug 100 further includes an auxiliary transfer passage 114 which is oriented so that the end which opens into the swirl chamber 112 is located at a site which is essentially intersective with the trajectory along which the fuel from a fuel injector 116 tends to travel.

A glow plug 118 extends into the swirl chamber 112 so as to be located close to the aforementioned trajectory and thus in a location wherein the injected fuel can be readily heated by the same. The disposition of the glow plug 118 also tends to disturb the swirling motion of the charge in the swirl chamber a little and promote dispersion of the fuel above the mouth of the auxiliary passage 114. The atomization of the fuel in this zone also is promoted by the flow of charge from the main combustion chamber 108 which passes through the auxiliary transfer passage 114. For further disclosure relating to the above phenomenon may be had to copending U.S. patent application Ser. No. 741,631 filed on June 5, 1985 in the name of Etoh et al.

Figure 1:
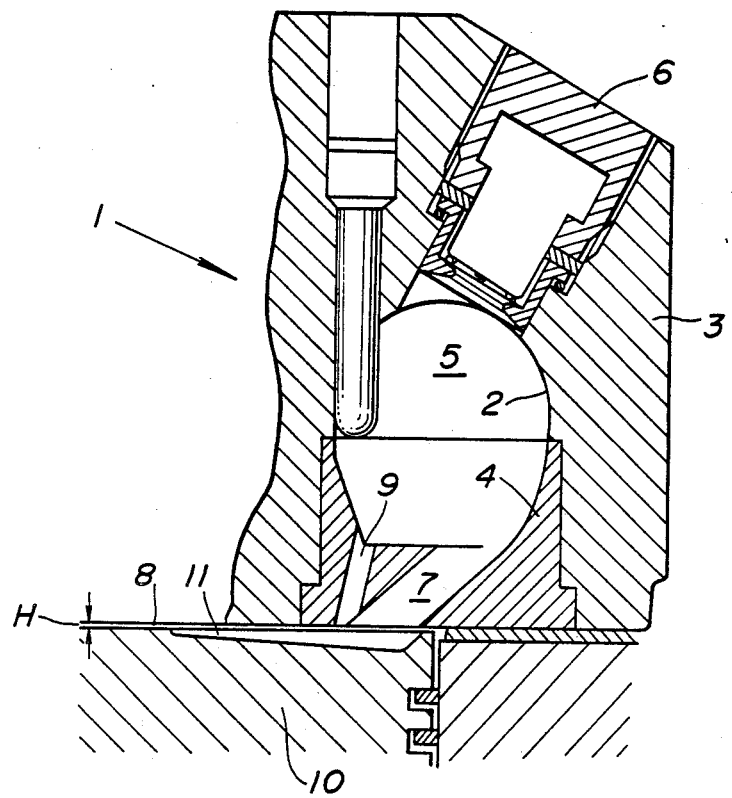
FIG. 1 is sectional elevation of the prior art arrangement discussed in the opening paragraphs of the instant disclosure.
Figure 2:
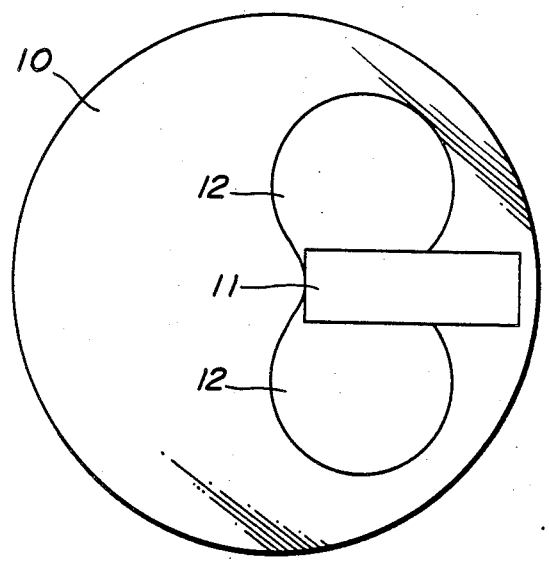
FIG. 2 is a plan view of the top of the piston shown in FIG. 1.

With the above arrangement a small amount of the fuel injected into the swirl chamber 112 passes through the auxiliary passage 114 under the influence of its own inertia and enters the main combustion chamber 108 in the form of relatively small well dispersed droplets. However, in some cases these droplets have sufficient kinetic energy that upon collision with the bottom of a trench 11 arrangement such as shown in FIG. 2 of the drawings, they tend to splash or rebound upwardly.

In order to prevent these energetic droplets from escaping to relatively remote locations of the main combustion chamber 108, the plug member 100 is formed with a recess 120 which in the first embodiment has an essentially elongate rectanglar configuration as shown in FIG. 4. This recess 120 defines a zone into which the aforementioned droplets can rebound and be entrapped in a manner which prevents their undesirable travel to remote sites of the combustion chamber 108.

In the first embodiment the recess includes a wall section 122 which is angled in a manner which tends to deflect any droplets which have sufficient energy after the first impact on the bottom of the trench to impact thereon, back toward the mouth of the main transfer passage 106 and thus into the path of the flame which jets therefrom during the expansion phase of the engine.

Accordingly, with the first embodiment nearly of the fuel which enters the main combustion chamber 108 at the end of the induction phase and/or the initial stage of the compression stroke of the piston 10 is located in either the dispersion recess means (11, 12) formed in the crown of the piston 10 or in the recess 120. Viz., due to the multiple collisions which the relatively high kinetic energy fuel droplets undergo in the near vicinity of the main combustion chamber ends of the main and auxiliary transfer passages 106, 114 they tend to have insufficient energy to escape and tend to remain in a location wherein entrainment and rapid combustion in the flame which is emitted from the swirl chamber 112 is assured.

In the first embodiment the recess is arranged to have a rectangular configuration which is elongate in the direction of the trench formed in the piston crown.

Figure 5:
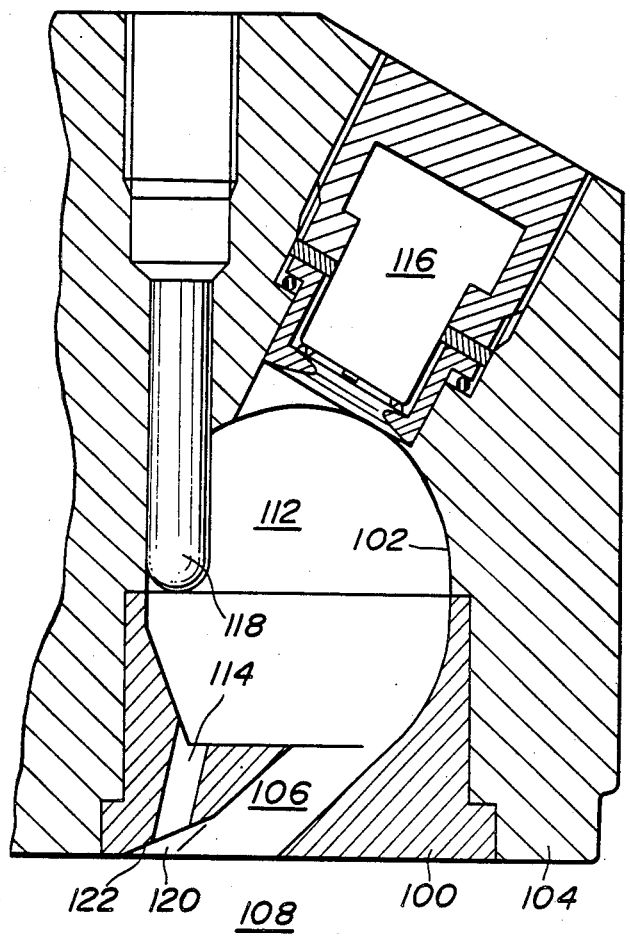
FIG. 5 is a sectional elevation showing a second embodiment of the present invention.
Figure 6:
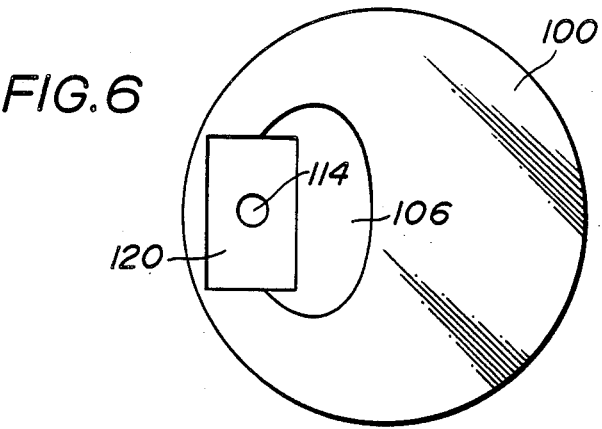
FIG. 6 is a plan view showing the shape which characterizes the embodiment of the present invention shown in FIG. 5.

FIGS. 5 and 6 shown a second embodiment of the present invention. In this arrangement the shape of the recess 120 (as best seen in FIG. 6) is relatively broad (approximately equal to the main transfer passage) and thus have a volume greater than that of the first embodiment so as to enable droplets which rebound off toward the side of the trench 11 can be trapped and prevented from "flying" too far from the mouth of the main transfer passage 106 and out into regions where they are apt to undergo slow combustion.

Figure 7:
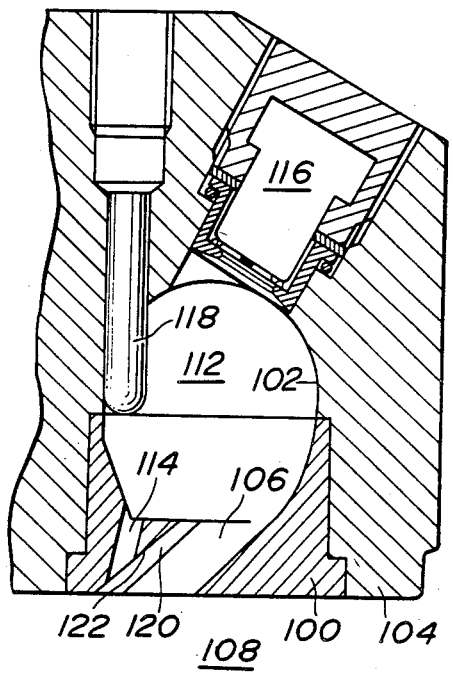
FIG. 7 is a sectional view of a third embodiment of the present invention.
Figure 8:
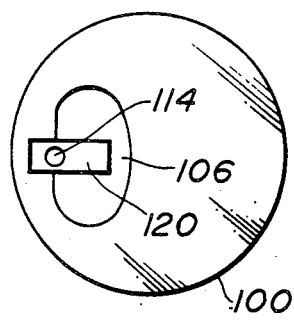
FIG. 8 is a plan view of the lower surface of the plug member used in the arrangement shown in FIG. 7.
Figure 9:
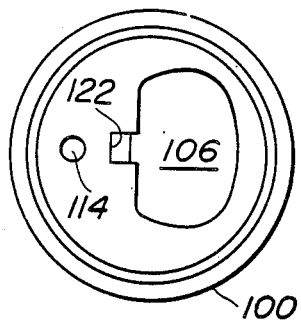
FIG. 9 is a top plan view showing the upper surface of the plug member of FIGS. 7 and 8.

FIGS. 7 to 9 shown a third embodiment of the present invention. In this arrangement the recess 120 which characterizes the present invention is formed so as lie along one side of the main transfer passage 106 and extend up to the swirl chamber 112. This arrangement increases the exposure of the fuel droplets to the flame produced during the combustion stroke of the engine and thus increase the tendancy for rapid combustion.

What is claimed is:

1. In an internal combustion engine
means defining a blind bore;
a piston reciprocatively disposed in said bore in manner to defined a variable volume main combustion chamber, said piston having a crown;
means defining a shaped recess in the crown of said piston;
means defining a fixed volume pre-chamber adjacent the blind end of said bore;
a main transfer passage, said main transfer passage having a first end which communicates with said pre-chamber and a second end which communicates with said main combustion chamber, said main transfer passage and said pre-chamber being arranged so that said main transfer passage introduces an air containing charge compressed in said main combustion chamber during a compression phase of said engine into said pre-chamber in a manner that the charge introduced into said pre-chamber tends to swirl in a predetermined direction therein;
a fuel injector for injecting fuel into said pre-chamber;
an auxiliary transfer passage having a first end which communicates with said pre-chamber and a second end which communicates with said main combustion chamber, said auxiliary transfer passage being oriented with respect to said fuel injector and the direction in which the charge in the pre-chamber swirls so as to permit a fraction of the injected fuel to pass therethrough and enter the main combustion chamber prior combustion of the air-fuel mixture in said pre-chamber, said auxiliary transfer passage being arranged to direct the fuel introduced into the main combustion chamber into said shaped recess formed in the crown of said piston; and means defining a recess which merges with said second end of said auxiliary transfer, said recess having a wall which is inclined toward said first end of the main transfer passage, said wall deflecting fuel which splashes back up out of the shaped recess in said piston crown into said recess and into a zone through which the flame from said swirl chamber passes during the expansion phase of the engine.

2. An internal combustion engine as claimed in claim 1, wherein said recess is formed so as to be elongate in a direction radial with respect to said bore.

3. An internal combustion engine as claimed in claim 1, wherein said recess has a width which is approximately that of said main transfer passage.

4. An internal combustion engine as claimed in claim 1 wherein said recess is formed in a manner to extend along said main transfer passage and to terminate at the first end of said main transfer passage.

* * * * *